E. PORTER.
Evaporating Pan.
No. 62,440. Patented Feb. 26, 1867.
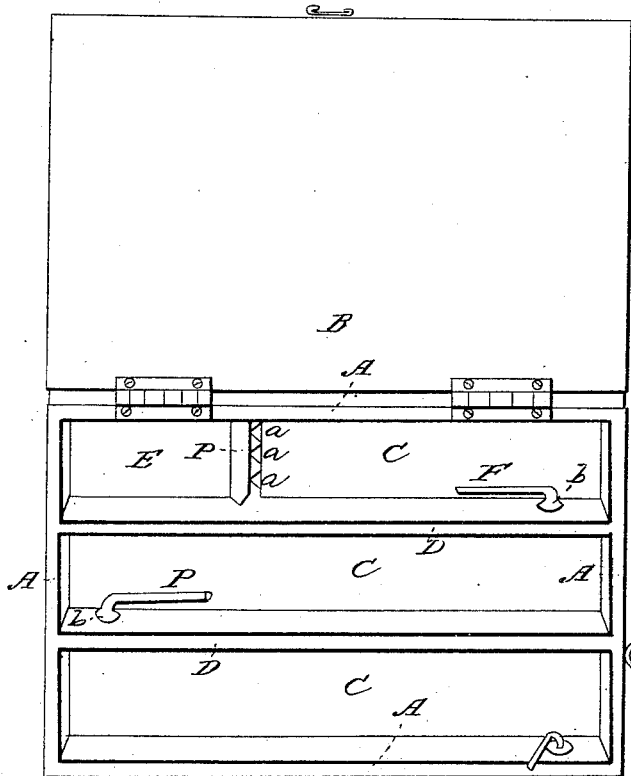
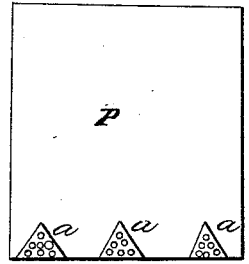
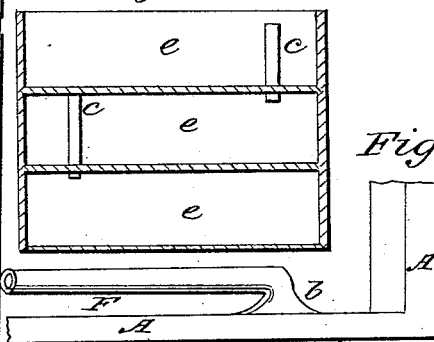
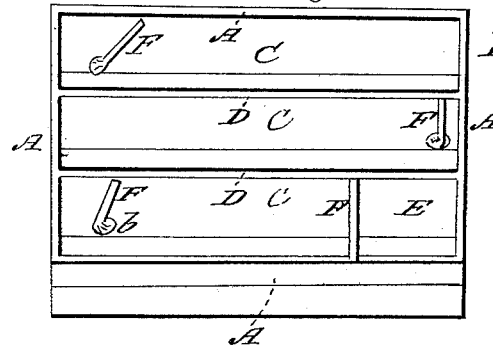
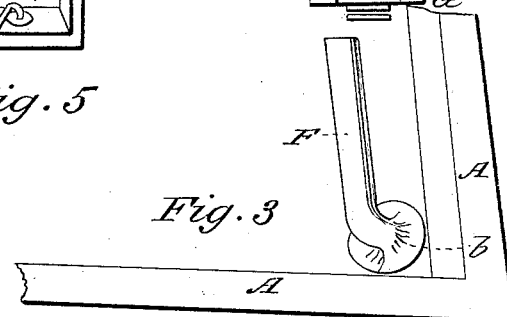

United States Patent Office.

EDWARD PORTER, OF CLINTON, ILLINOIS.

Letters Patent No. 62,440, dated February 26, 1867.

---

IMPROVED APPARATUS FOR THE MANUFACTURE OF SUGAR AND SIRUP.

---

The Schedule referred to in these Letters Patent and making part of the same.

---

TO ALL WHOM IT MAY CONCERN:

Be it known that I, EDWARD PORTER, of Clinton, in the county of De Witt, and State of Illinois, have invented a new and improved Method of Manufacturing Sugar and Molasses from Cane; and I do hereby declare that the following is a full, clear, and exact description thereof, reference being had to the accompanying drawings, and to the letters of reference marked thereon.

Figure 1 is a plan of a juice-box.

Figures 2 and 3 are views of a tube and portion of juice-box detached.

Figure 4 is a side elevation of a partition, P, of figs. 1 and 5.

Figure 5 is a view in perspective of a juice-box, looking into the box.

Figure 6 represents a longitudinal section of the granulating boxes.

The object of my invention is to produce a good quality of sugar and molasses from sorghum and other canes by a thorough purification of the juice previous to its being evaporated. To accomplish this object I pass the juice through a series of peculiarly-constructed boxes in such a manner that all the impurities contained in the juice will be precipitated to the bottom of the boxes, and retained, while the purified juice is drawn off. The said boxes are arranged in gradation one above another, the bottom of the upper one being on a level, or nearly so, with the top of the next one below, and so on down. The internal arrangement of the boxes is the same, so that a description of one will be sufficient. They are constructed about ten feet long, three feet wide, and one foot deep.

In the drawings, A A represent the walls of the box, and B the lid. This box is divided into apartments or vats C C by the partitions D D. A filter, E, is formed in the end of one of the vats by means of the partition P, as represented. Through the bottom of the said partition are apertures $a\ a\ a$ for the passage of the juice through it. The filter may be dispensed with in all the boxes except the upper one, into which the juice is conveyed from the mill. F F are adjustable tubes, bent at right angles, and the short arms inserted through the partitions near the bottom of the box, and secured by means of nuts, (one of which is shown at G,) which screw on to the ends of the tubes, a washer being interposed between the nuts and the partitions. By means of the shoulders $b\ b$ and the nuts and washers, the tubes are made to pass, water-tight, through the partitions without fitting tightly in the holes through which they pass. The long arms of the tubes may be adjusted from a horizontal to a perpendicular position, and when in a perpendicular position they extend nearly to the top of the partitions. Through the said tubes the juice is conveyed from one vat to another throughout the series, the long arms of the tubes being on the side from which the juice approaches. By placing the tubes alternately at opposite ends of the vats, the juice, in passing through the series, will have an alternate horizontal motion. After the juice has passed through all the vats in the first box, it is conveyed into the one below, by means of a pipe connected to the short arm of the tube, which extends through to the outside of the box, and so on throughout the series and into the evaporator.

Instead of arranging the juice-boxes in gradation, one above another, as described, I may arrange them all on a level; and instead of having a number of boxes, I may use but one, of sufficient size to contain the required number of vats. The filter E may be composed of grass, or grass and charcoal, or any other suitable material, and should be renewed at least once a day. The juice is first conveyed from the mill or crusher into the filter, where the lighter impurities, and such as will not readily precipitate, are separated from it. The filter further serves to prevent the agitation of the juice on passing into the vat. The long arms of the tubes being arranged in a perpendicular position, it will be seen that the juice must rise to the top of the first vat before it will be conveyed through it into the next vat, (entering at the bottom of the vat,) and is thus conveyed throughout the entire series. In passing through the vats the gummy and glutinous matter contained in the juice is precipitated to the bottom, and the purest juice will be on the surface; and by means of the bent tubes, the juice is drawn from the surface of one vat and deposited on the bottom of the next, throughout the series, without being agitated, which allows the dregs to settle on the bottom of the vats. And by using a sufficient number of boxes and vats, the juice may be thoroughly purified before it reaches the evaporator, and freed from the gummy substance which prevents the granulation of the sugar and injures the quality of the molasses. After the juice has been evaporated to the proper consistence, it may be passed through a series of boxes and vats similar to those described, for the purpose of further purification, and finally discharged into the granulating boxes. The more numerous the vats are, in proportion to the amount of juice passed through them in a given time, the more thorough and effectual will be the purification and cleansing of the juice, from the fact that every time it passes from one vat to another it is the purest portion that is drawn off.

As the tubes may be adjusted to any angle between a perpendicular and a horizontal position, it will readily be seen that the juice may be drawn to any point to which the mouths of the tubes may be turned, so that, when it is desired to do so, all the purified juice may be drawn off; after which the dregs may be removed and the vats cleansed. The granulating boxes $e\ e\ e$ may be arranged in the ordinary manner, or in tiers, one directly above another, as shown in fig. 6. When thus arranged, each box except the lower one is provided with a straight tube, $c$, which is inserted through the bottom, and extends up into the boxes as high as it is intended the sirup should rise in it. In filling the granulating boxes, the upper one should be filled first; and when the sirup rises to the top of the tube, it will descend through it, and fill the next box below, and in like manner all the boxes in the tier will be successively filled. This arrangement of the granulating boxes is very convenient, as by it they will occupy much less space than if they were arranged side by side in the ordinary manner.

My invention may be used not only for purifying and cleansing juices and sirups for the manufacture of sugar and molasses, but also for purifying cider and all other liquids requiring purification, and it secures many advantages in the manufacture of sugar and molasses, among which are the following:

1. By it the manufacturer is enabled to purify and work up his material very rapidly, without being compelled to keep a large quantity in a vessel, to settle, in which condition it will soon ferment, and thereby injure the quality of the sugar.

2. The gummy and glutinous substances, and other impurities contained in the juice, so deleterious to the production of a good quality of sugar and molasses, are separated from it before it is evaporated, which overcomes the difficulty heretofore experienced from the tendency of these impurities to precipitate and adhere to the bottom of the evaporator during the process of evaporation.

3. The sugar and molasses made from northern canes by this process are free from the peculiar taste and smell known as the sorghum taste and smell.

4. The sirup granulates more rapidly and thoroughly, on account of the complete separation of the glutinous substances and other impurities from the juice.

5. On account of the absence of the said impurities, the molasses is more readily separated from the sugar by pressure or other means.

6. On account of the thorough purification of the juice and sirup, the tendency of molasses made from northern canes to ferment and become jellied is overcome.

Having described my invention, what I claim as new, and desire to secure by Letters Patent, is—

1. The adjustable tubes F F, filter E, and vats C C, substantially as and for the purpose set forth.

2. The granulating boxes $e\ e\ e$, and tubes $c$, when arranged substantially as shown and for the purpose set forth.

EDWARD PORTER.

Witnesses:
 JOSEPH J. KELLY,
 JAMES DE LAND.